(12) United States Patent
Aqrabawi et al.

(10) Patent No.: US 11,500,444 B2
(45) Date of Patent: Nov. 15, 2022

(54) INTELLIGENT PREDICTION OF PROCESSOR IDLE TIME APPARATUS AND METHOD

(71) Applicant: Intel Corporation, Santa Clara, CA (US)

(72) Inventors: Leo Aqrabawi, Portland, OR (US); Chia-hung S. Kuo, Folsom, CA (US); James G. Hermerding, II, Vancouver, WA (US); Premanand Sakarda, Acton, MA (US); Bijan Arbab, San Diego, CA (US); Kelan Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 16/870,514

(22) Filed: May 8, 2020

(65) Prior Publication Data

US 2021/0349519 A1 Nov. 11, 2021

(51) Int. Cl.
*G06F 1/00* (2006.01)
*G06F 1/3234* (2019.01)
*G06F 12/0815* (2016.01)
*G06N 5/04* (2006.01)
*G06N 20/00* (2019.01)
*G06F 1/3203* (2019.01)

(52) U.S. Cl.
CPC ........ *G06F 1/3234* (2013.01); *G06F 12/0815* (2013.01); *G06N 5/04* (2013.01); *G06N 20/00* (2019.01); *G06F 1/3203* (2013.01); *G06F 2212/1032* (2013.01)

(58) Field of Classification Search
CPC .................. G06F 1/3234; G06F 12/815; G06F 2212/1032; G06N 20/00; G06N 5/04
USPC ....................................................... 713/323
See application file for complete search history.

(56) References Cited

U.S. PATENT DOCUMENTS

| | | | | |
|---|---|---|---|---|
| 9,176,570 B2* | 11/2015 | Jeyaseelan | ............ | G06F 1/3253 |
| 2006/0179186 A1* | 8/2006 | Nye | ............ | G06F 5/06 |
| | | | | 710/52 |
| 2014/0095801 A1* | 4/2014 | Bodas | ............ | G06F 1/3275 |
| | | | | 711/135 |
| 2016/0139982 A1* | 5/2016 | Yu | ............ | G06F 12/0246 |
| | | | | 714/768 |
| 2016/0187959 A1* | 6/2016 | Nagarajan | ............ | G06F 1/3237 |
| | | | | 713/324 |
| 2016/0378427 A1* | 12/2016 | Sharma | ............ | G10L 19/0212 |
| | | | | 700/94 |
| 2019/0101973 A1* | 4/2019 | Ashkar | ............ | G06F 1/324 |
| 2021/0349519 A1* | 11/2021 | Aqrabawi | ............ | G06F 1/3215 |

* cited by examiner

*Primary Examiner* — Volvick Derose
(74) *Attorney, Agent, or Firm* — Schwabe, Williamson & Wyatt, P.C.

(57) ABSTRACT

A machine-learning (ML) scheme running a software driver stack to learn user habits of entry into low power states, such as Modern Connect Standby (ModCS), and duration depending on time of day, and/or system telemetry. The ML creates a High Water Mark (HWM) number of dirty cache lines (DL) as a hint to a power agent. A power agent algorithm uses these hints and actual system's number of DL to inform the low power state entry decision (such as S0i4 vs. S0i3 entry decision) for a computing system.

20 Claims, 5 Drawing Sheets

INTELLIGENT PREDICTION OF PROCESSOR IDLE TIME APPARATUS AND METHOD

BACKGROUND

Optimizing decisions for a processor to enter lower power states such as S0i4 (e.g., Dynamic Random Access Memory (DRAM) off state with two-level-memory configuration) result in higher entry and/or restart costs for these lower power states. The breakeven point can be in the order of minutes. Delaying S0i4 entry, or false entry (with exit within minutes) results in wasted energy and battery life that can impact a users' Hours of Battery Life (HoBL) experience.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

A power policy for a memory subsystem that is controlled by a power agent algorithm (e.g. pCode firmware executing on a power control unit (PCU)) may use heuristics to build one-size-fits-all decision to guess if a user of a processor will remain in Modern Connect Standby (ModCS), or if the user planned to wake up the processor shortly after. In this case, the power agent algorithm assumes history as an indication of the future. Modern Standby or ModCS is an expansion of Windows® 8.1's Connected Standby. ModCS is just an example, and the various embodiments are applicable to other low-power idle mechanisms.

The power agent algorithm detects when a user of a processor has been in ModCS long enough, and it decides whether the entry cost is justified based on the number of dirty cache lines in the system cache. Examples of system cache include, Last Level (LL) cache in one-level memory (1LM) mode configuration, or DRAM cache in two-level memory (2LM) mode configuration.

However, power agent algorithm discussed above cannot predict and fine tune decisions based on individual user persona or behavioral patterns, so it cannot fine tune entry decision for a user of a processor. This results in false entry or missed opportunity cases. Also, the power agent algorithm may require the processor to stay at PC10 power state for a while before deciding to enter S0i3 or S0i4 state. In some cases where the power agent algorithm decides to enter S0i3 state before S0i4 state, the decision results in wasted energy of the time spent in the S0i3 state when a predictive S0i4 state entry would have allowed longer time at lower power state, and additional wasted energy when exiting the S0i3 state and reentering the S0i4 state. While the embodiments are described with reference to S0ix states, the embodiments are applicable to other low power states such as those described with reference to Advanced Configuration and Power Interface (ACPI) specification embodied in Version 6.3 released January 2019.

Here, S0ix-states represent the residency in the Intel® SoC (system-on-chip) idle standby power states, where 'x' is a number. The S0ix states shut off part of the SoC when they are not in use. For example, S0i4 puts a Dynamic Random Access Memory (DRAM) in off state with two-level memory configuration. S0i4 is a deeper sleep state compared to S0i3. The S0ix states are triggered when specific conditions within the SoC are achieved. For instance, when certain components of a computing system are in low power states, the SoC may decide to enter a particular deeper power state. In the deepest power state (e.g., S0i4), the SoC consumes the least amount of power.

Some embodiments use higher level machine-learning (ML) running at software driver stack (such as ML based Dynamic Platform Thermal Framework driver or DPTF-ML driver) to learn user habits of entry into low power states, such as ModCS, and duration depending on time of day, and system telemetry. The ML creates a High Water Mark (HWM) number of dirty cache lines as a hint to a power agent. The power agent algorithm of various embodiments uses these hints and actual system's number of dirty cache lines to inform the low power state entry decision, such as S0i4 vs. S0i3 entry decision.

There are many technical effects of various embodiments. For example, power agent algorithm or scheme creates significant battery life savings for a customer while in low power state such as ModCS standby state. The power agent algorithm or scheme of various embodiments allow computing platform cost reduction because the scheme allows the computing platform to use get even lower or deeper power states (e.g., ModCS power state) with cheaper DRAM Dual-inline memory modules (DIMMs) than they can with more expensive low power double data rate (LPDDR) DIMMs. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e g, immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Figure 1:
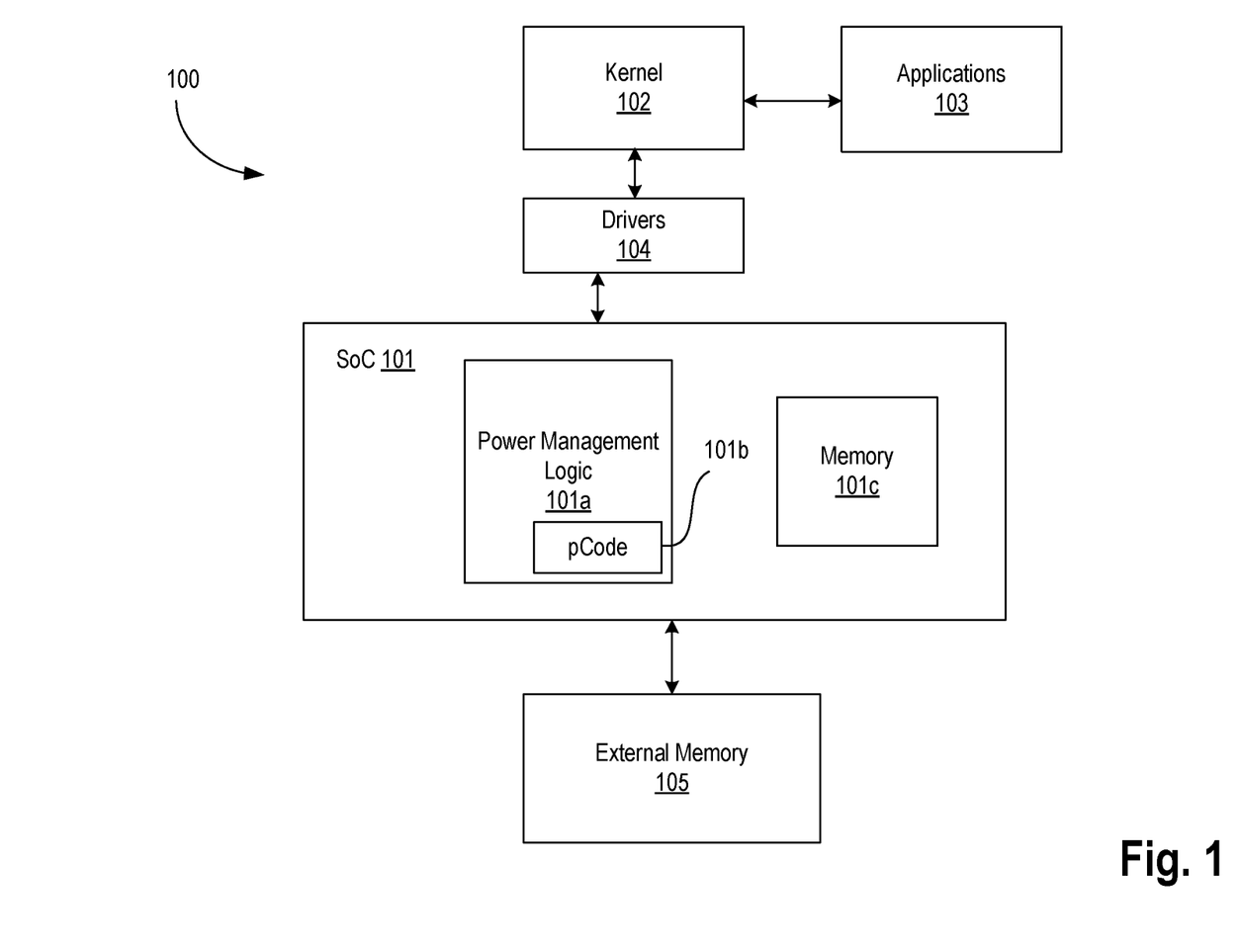
FIG. 1 illustrates a high-level computing architecture which is operable to intelligently predict idle time to reduce entry energy cost associate with a deep sleep state, in accordance with some embodiments.

FIG. 1 illustrates a high-level computing architecture 100 which is operable to intelligently predict idle time to reduce entry energy cost associate with a deep sleep state, in accordance with some embodiments. Architecture 100 is a simplified version of the system-on-chip (SoC) of FIG. 5. In some embodiments, architecture 100 comprises SoC 101, kernel 102 (e.g., an operating system), applications 103, software drivers 104, and external memory 105. SoC 101 may include a number of intellectual property (IP) blocks such as processor cores, voltage regulators (VRs), cache, etc. In some embodiments, SoC 101 includes power management logic 101a which executes a code 101b (herein referred to as pCode) to manage power for SoC 101 and architecture 100. SoC 101 may also include memory 101c. Memory 101c may be first, second, third, and/or last-level cache. In some embodiments, memory 101c is not a cache memory but a larger storage than cache to store data. A processor core may access memory 101c when data is not found in the cache(s), for example. In some embodiments, SoC 101 is further coupled to an external memory 105 such as DIMMs.

In some embodiments, drivers 104 include a stack of drivers (e.g., one or more drivers) that execute a higher ML scheme for dynamic tuning of a parameter (e.g., prediction of idle time). The ML scheme learns user habits of entry into low power states, such as ModCS, and duration depending on time of day (TOD), day of week (DOW), calendar busy and free time slots, and other system telemetry. The ML creates a High Water Mark (HWM) number of dirty cache lines as a hint to Power Management Unit 101a to decide which power state to enter (e.g., SiO3 or SiO4). Power Management Unit 101a (also referred to as power agent) executes an algorithm using proprietary or OEM (original equipment manufacturer) accessible software code, such as pCode, to analyze these hints and an actual system's number of dirty cache lines to inform the low power state entry decision such as S0i4 vs. S0i3 entry decision. As such, architecture 100 enters a power state that results in higher power savings under the SoC's usage conditions. For example, based on the telemetry information, the ML scheme predicts an idle duration for SoC 101 and, then depending of that duration, puts the SoC 101 in a sleep mode to release most of the energy savings from that sleep mode. As such, architecture 100 may delay entry to S0i4 state, or false entry into a power state that results in minutes to exit from.

Figure 2:
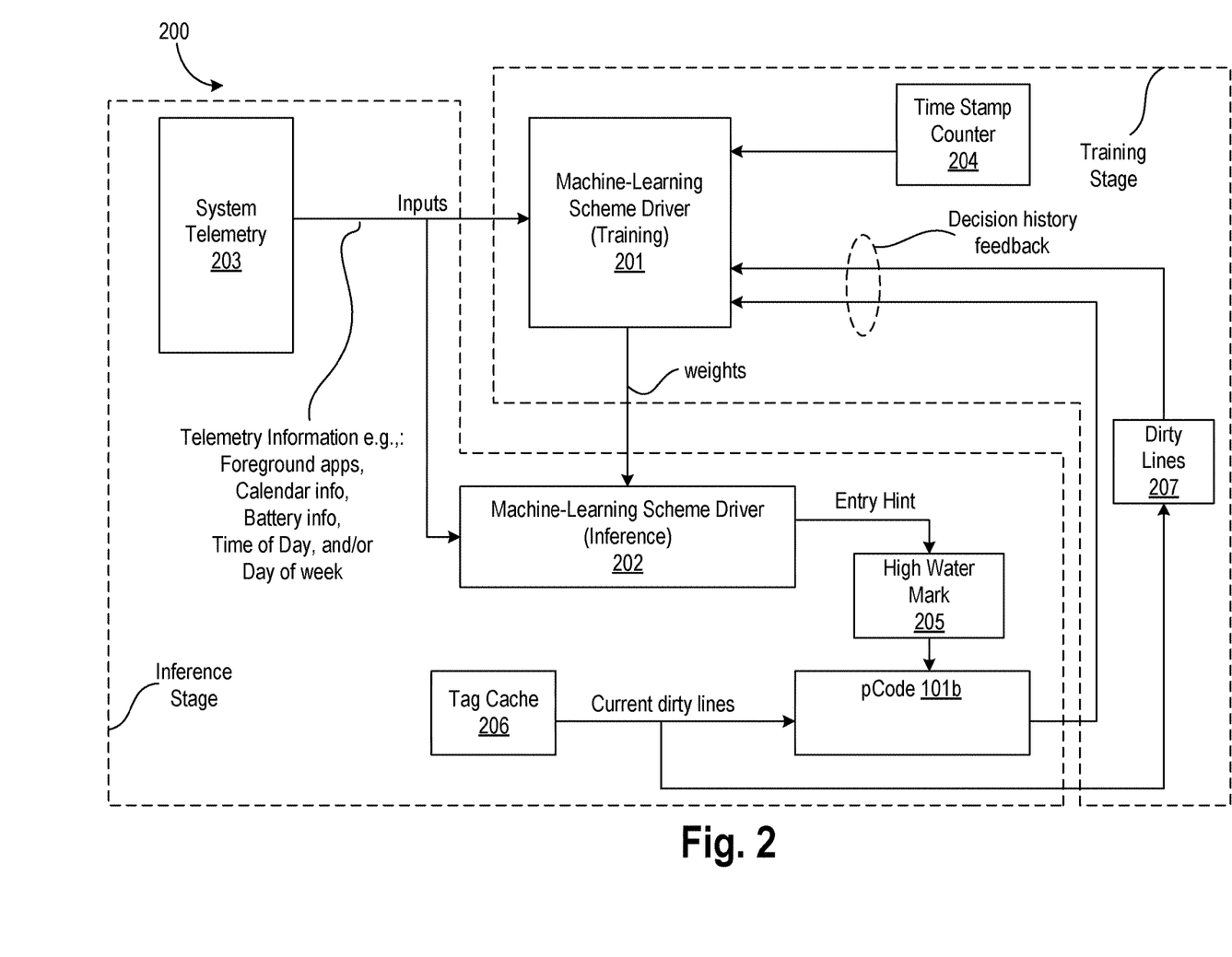
FIG. 2 illustrates a flowchart of an architecture to intelligently predict idle time to reduce entry energy cost, in accordance with some embodiments.

FIG. 2 illustrates flowchart 200 of an architecture to intelligently predict idle time to reduce entry energy cost associate with a deep sleep state, in accordance with some embodiments. Flowchart 200 illustrates functional blocks that may be hardware, software, or a combination of them. The various blocks may execute in a sequence, in parallel, or out of order to generate the decision to enter a particular power state.

In some embodiments, the architecture to intelligently predict idle time comprises a machine-learning (ML) scheme driver 201 used for training a ML model for dynamic tuning, ML scheme driver 202 used for inference, system telemetry information 203, register to store Time Stamp Counter (TSC) 204, register to store HWM 205, pCode 101b to determine a decision about a lower state, Tag cache 206, and register to store number of dirty lines 207. In some embodiments, ML scheme driver 201 comprises software, hardware, or a combination of them. For example, ML scheme driver 201 comprises or has access to multipliers and adders to train a ML model and generate outputs based on trained weights (or coefficients) and inputs (e.g., telemetry inputs). In some embodiments, ML scheme driver 201 implements machine-learning using one or more of: Logistic Regression, Random Forest, or Neural Network.

In some embodiments, ML scheme driver 202 assumes trained weights and infers an output (e.g., Entry Hint) based on Inputs (e.g., telemetry information). In this case, the output is generated much faster because the ML model by driver 201 is already trained (e.g., weights are already determined). In some embodiments, ML scheme driver 202 comprises software, hardware, or a combination of them. For example, ML scheme driver 202 comprises or has access to multipliers and adders to train a ML model and generate outputs based on trained weights (or coefficients) and inputs (e.g., telemetry inputs).

In some embodiments, system telemetry 203 comprises instructions and mechanism to train the ML algorithm. For example, system telemetry 203 has access to a myriad of user behavior which are used as inputs for ML drivers 201 and 202. In some embodiments, system telemetry 203 logs user ModCS entry and/or exit history and time-in-state (e.g., time spent in a particular power state) in a scratchpad space (e.g., memory) to train the ML algorithm whenever it runs for training. In some embodiments, the time-in-state is a predicted variable which is used as feedback during the training phase. In some examples, the time-in-state may not be used during inference. In some embodiments, the logs in the scratchpad are events that can be a trigger to start the ML training algorithm by driver 201 (or to start the ML inference algorithm by driver 202). When training, weights are modified to achieve a desired outcome. In some embodiments, system telemetry 203 can use data from foreground applications at the time of entry and/or exit. In some embodiments, system telemetry 203 can use data from a user calendar. For example, data indicating free, busy, out-of-office information etc. to predict user behavior on a specific time of day (TOD), day of week (DOW), and thus predict duration of standby time in a particular power state. The telemetry information is not limited to the above examples. Other information desirable for ML scheme drivers 201/202 to assist it to decide what power state to enter and when to enter can also be used.

In general, due to high number of inputs to the ML algorithm, traditional software control algorithms are too complex and energy consuming. The ML algorithm adapts over time to specific user habits and behaviors. In some embodiment, the ML algorithm uses one or more of: Logistic Regression, Random Forest, or Neural Network to train weights. In some embodiments, ML algorithm 201/202 is run in real-time. In some embodiments, ML algorithm 201/202 runs upon an event rather than in real-time. For example, ML algorithm 201/202 runs on the user's system triggered by changes on telemetry events above. In another example, ML algorithm 201/202 runs infrequently on a user's system and trains on a logged history of telemetry over that period. In some embodiments, ML algorithm 201 is run as part of ModCS entry flow to update the ML network and then run the inference by ML algorithm 202. In some embodiments, training of ML algorithm 201 is offloaded to the cloud (or server) based on user telemetry.

Upon exit from a low power case (e.g., ModCS), in some embodiments, ML driver 201 reads the Time Stamp Counter (TSC) 204 and feeds time-in-state (TIS) information to ML algorithm 201. TSC 204 is a register (e.g., a 64 bit register) in x86 processors. TSC 204 can be accessed using kern-.timecounter.invariant_tsc sysctl on FreeBSD or constant_tsc flag in Linux's/proc/cpuinfo. The TSC ticks at the processor's (e.g., core of SoC 101) nominal frequency, regardless of the actual CPU core clock frequency due to turbo or power saving states. As such, TSC ticks are counting the passage of time, not the number of CPU clock cycles elapsed. In some embodiments, in addition to TSC 204 or instead of TSC 204, ML scheme driver 201 uses higher resolution counters available via Windows® API such as QueryPerformanceCounter and QueryPerformanceFrequency.

In various embodiments, ML scheme driver 201 reads a number of dirty lines in a dirty lines scratchpad (e.g., a memory region) to feedback into ML algorithm 201 based on the time-in-state information, watermark 205, and/or DL count 207 to feedback the prediction error to ML algorithm 201. A dirty cache line in general refers to data in the cache which is modified relative to a copy of the data in main memory 101c or 104. A dirty bit is asserted for a cache line indicating that the contents of that cache line are different than what current resides in an operating memory. A number of dirty lines (DL) indicates a number of cache lines with data modified compared to corresponding data in main memory.

In various embodiments, upon entry to a power state (e.g., ModCS entry) power agent 101a (or any suitable microcontroller) executes pCode 101b (or any other software) or performs a hardware and/or software function of comparing current dirty lines from Tag Cache 206 with HWM 205 established by ML driver 202. Tag Cache 206 is a requested memory location. Data is generally transferred between memory 105 and cache. The data is transferred in blocks of fixed size, called cache lines or cache blocks. When a cache line is copied from memory into the cache, a cache entry is created. The cache entry will include the copied data as well as the requested memory location (i.e., Tag Cache 206).

HWM 205 is stored in a register which is accessible by the drivers 201 and/or 202. HWM 205 indicates a threshold level or count of dirty cache lines that dictates whether SoC 101 should enter a particular power state. As ML scheme 201 or 202 runs over time (e.g., throughout a day), it will keep updating the scratch pad with the latest HWM 205. This HWM 205 threshold is regularly compared with a current number of dirty cache lines to predict what power state (e.g., S0i3 or S0i4) to enter.

For example, pCode 101b compares the HWM 205 to the number of dirty lines in DRAM and builds a simple enter in S0i4 or enter in S0i3 decision. For example, if the number of dirty lines in the DRAM is higher than HWM 205, pCode 101b will put the SoC 101 or computing system in S0i3 state to mitigate the entry energy cost of flushing those dirty lines, otherwise, it will put the SoC 101 or computing system in S0i4 state, since the predicted time-in-state for ModCS is expected to be long enough to cover the energy cost of entry. After comparing HWM 205 and the current number of DL, pCode 101b updates the registers that store TSC 204 and/or TIS. TSC 204 is used later in calculation of TIS to feed to ML scheme 201. In some embodiments, after comparing HWM 205 and the current number of DL, pCode 101b provides its decision to ML driver 201. In some embodiments, pCode 101b also updates a count for a number of dirty DRAM lines for future training/learning by ML scheme driver 201.

In some embodiments, upon exit from the power state (e.g., exit from ModCS), pCode 101b writes the time-stampcounter 204 into the scratchpad register to calculate time-in-state and feed into the ML algorithm 201. ML algorithm 201 will then use the time-stamp into to predict the time-in-state for future entries.

Figure 3:
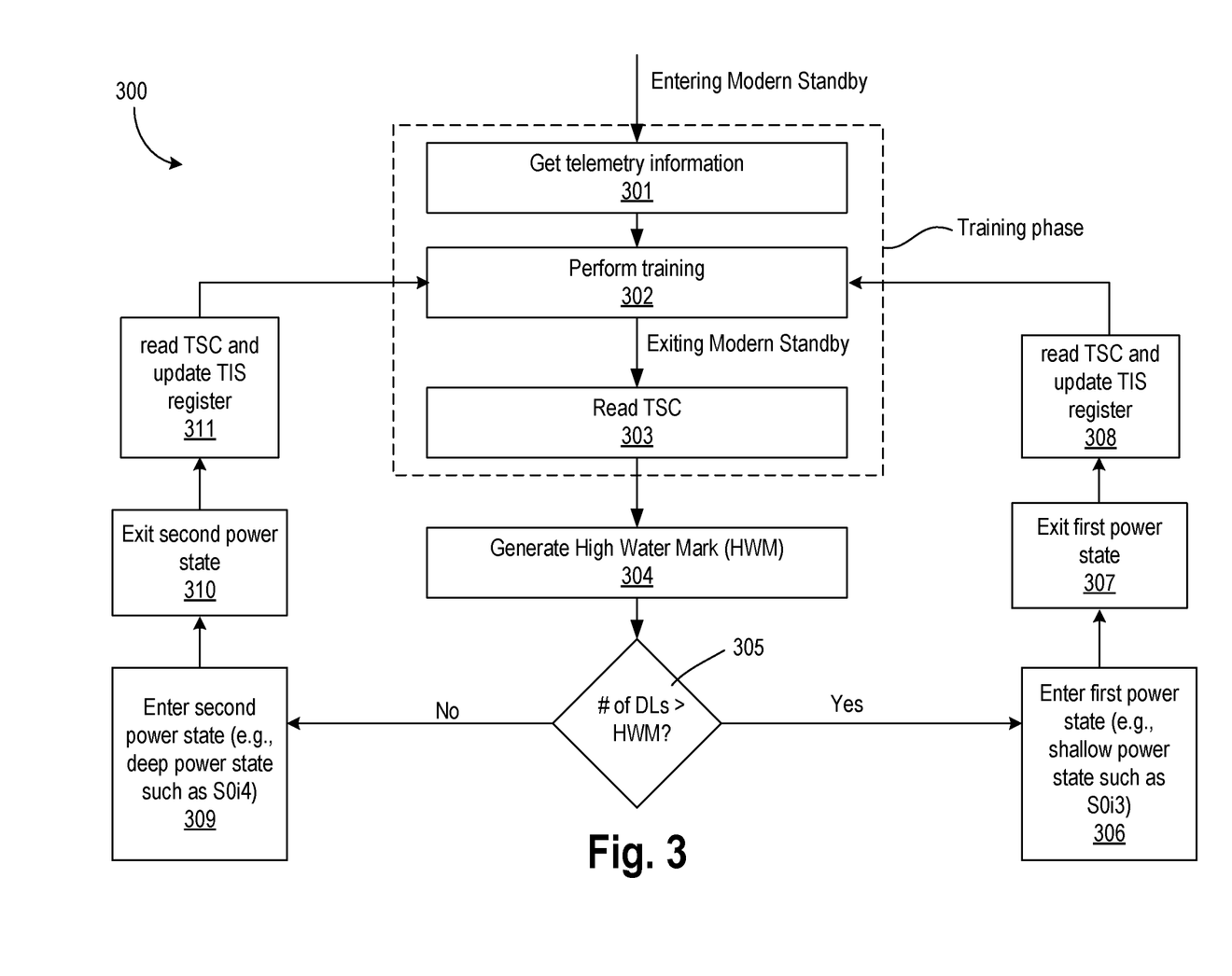
FIG. 3 illustrates a method of intelligently predicting idle time by training a machine-learning algorithm, in accordance with some embodiments.

FIG. 3 illustrates method 300 of intelligently predicting idle time by training a machine-learning algorithm, in accordance with some embodiments. While the blocks are shown in a particular order, the order can be modified. For example, some blocks are performed in parallel to others, and some before others.

At block 301, system telemetry logic 203 gathers telemetry information from various sources to predict user behavior in response to entering a standby mode such as Modern Standby. For example, system telemetry logic 203 identifies foreground applications at the time of entry and/or exit of a power state, calendar information indicating when a user of the SoC is free, busy, out of office, etc., battery information (e.g., charging and/or discharging patterns), time of day, and/or day of week. The telemetry information is provided to ML driver 201 to train the machine-learning model as indicated by block 302. In some embodiments, a change in telemetry information (compared to its previous state or value) is an event that causes ML driver 201 to begin training of its ML model. After training the ML model, the system exits the standby mode (e.g., exits the Modern Standby mode). At block 303, ML driver also reads TSC register(s) for performing training of its ML model. The output of the trained model (e.g., after weights are calibrated) is HWM which is provided to a power management agent 101a, as indicated by block 304. Blocks 301, 302, or 303 are part of a training phase.

At block 305, power management agent 101a compares a current number of dirty lines (cache lines) with the HWM. If the number of dirty lines (DL) is greater than HWM, then power management agent 101a causes SoC 101 or computing system to enter a first power state which is a less deep power state compared to a second power state. Upon such determination, power management agent causes SoC 101 to enter the first power state (e.g., a shallow power state such as Si03) as indicated by block 306. Once SoC 101 or the computing system exits the first power state, as indicated by block 307, ML driver 201 reads TSC register(s) and updates the TIS register as indicated by block 308. The process then returns to retraining the model as indicated by block 302.

If the number of dirty lines (DL) is less than HWM, then power management agent 101a causes SoC 101 or computing system to enter a second power state which is a more deep power state compared to the first power state. Upon such determination, then power management agent 101a causes SoC 101 or computing system to enter the second power state which is a deep power state compared to the first power state (e.g., S0i4) as indicated by 309. Once SoC 101 or the computing system exits the second power state, as indicated by block 310, ML driver 201 reads TSC register(s) and updates the TIS register as indicated by block 311. The process then returns to retraining the model as indicated by block 302.

Figure 4:
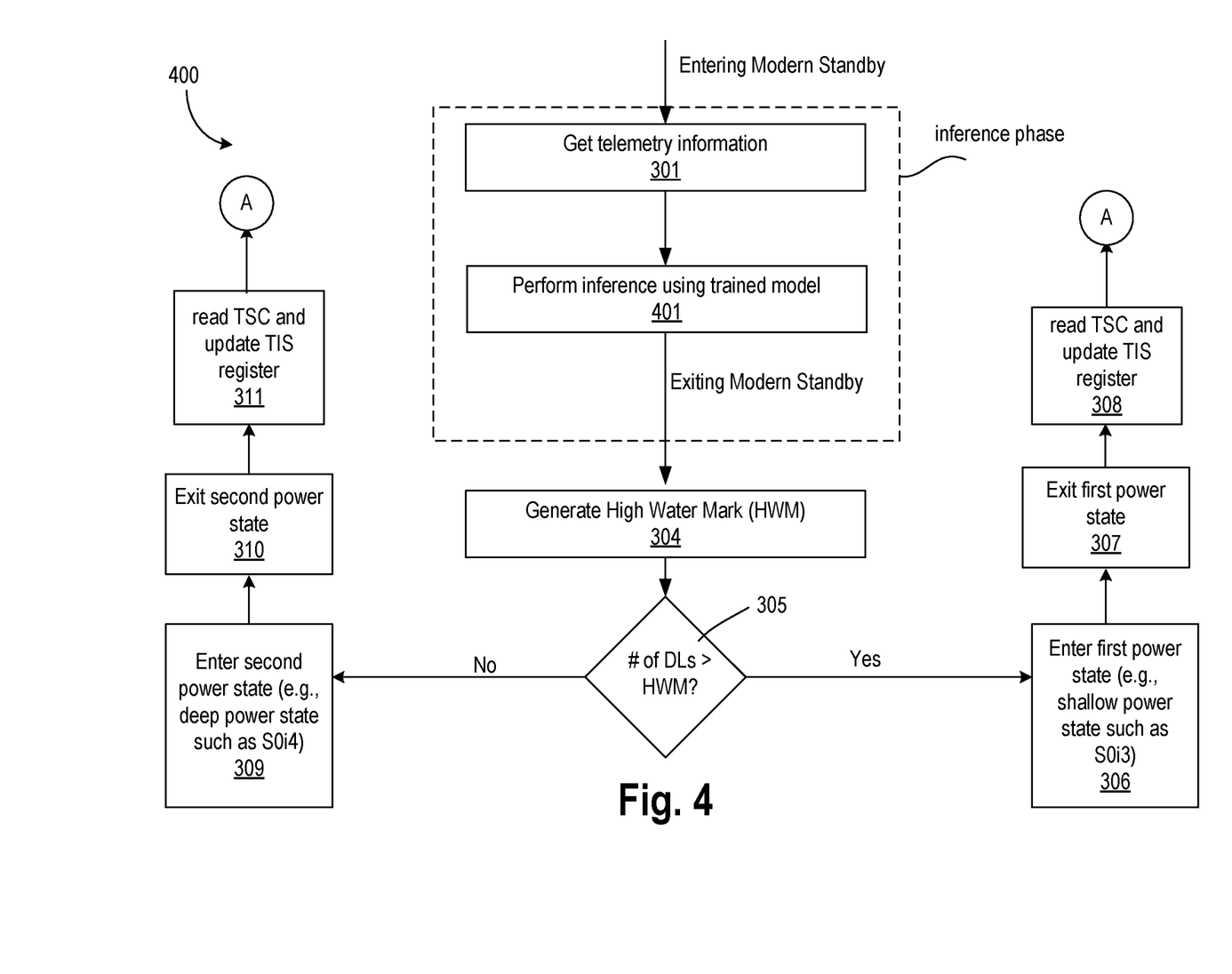
FIG. 4 illustrates a method of intelligently predicting idle time by using inference, in accordance with some embodiments.

FIG. 4 illustrates method 400 of intelligently predicting idle time by using inference, in accordance with some embodiments. Method 400 is similar to method 300 but for inference by block 401 instead of training of weights. In this case, blocks 302 and 303 for training are removed. In the inference phase, trained weights are used by ML driver 202 with new or updated telemetry information, to generate HWM. This process is faster than the method of FIG. 3 because the model is not retrained, which is a compute intensive task.

Elements of embodiments (e.g., flowchart 300, 400, and scheme described with reference to FIGS. 1-4) are also provided as a machine-readable medium (e.g., memory) for storing the computer-executable instructions (e.g., instructions to implement any other processes discussed herein). In some embodiments, a computing platform comprises a memory, a processor, a machine-readable storage media (also referred to as tangible machine readable medium), a communication interface (e.g., wireless or wired interface), and a network bus coupling them.

In some embodiments, the processor is a Digital Signal Processor (DSP), an Application Specific Integrated Circuit (ASIC), a general purpose Central Processing Unit (CPU), or a low power logic implementing a simple finite state machine to perform the method of flowcharts 200-400, and/or various embodiments, etc.

In some embodiments, the various logic blocks of the system are coupled together via the network bus. Any suitable protocol may be used to implement the network bus. In some embodiments, the machine-readable storage medium includes instructions (also referred to as the program software code/instructions) for intelligent prediction of processor idle time as described with reference to the various embodiments and flowchart.

Program software code/instructions associated with flowcharts 200-400 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts 200-400 (and/or various embodiments) are executed by the computer system.

In some embodiments, the program software code/instructions associated with flowcharts 200-400 (and/or various embodiments) are stored in a computer executable storage medium and executed by the processor. Here, computer executable storage medium is a tangible machine readable medium that can be used to store program software code/instructions and data that, when executed by a computing device, causes one or more processors to perform a method(s) as may be recited in one or more accompanying claims directed to the disclosed subject matter.

The tangible machine readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with flowcharts 200-400 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, magnetic random access memory, ferroelectric memory, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, the tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 5:
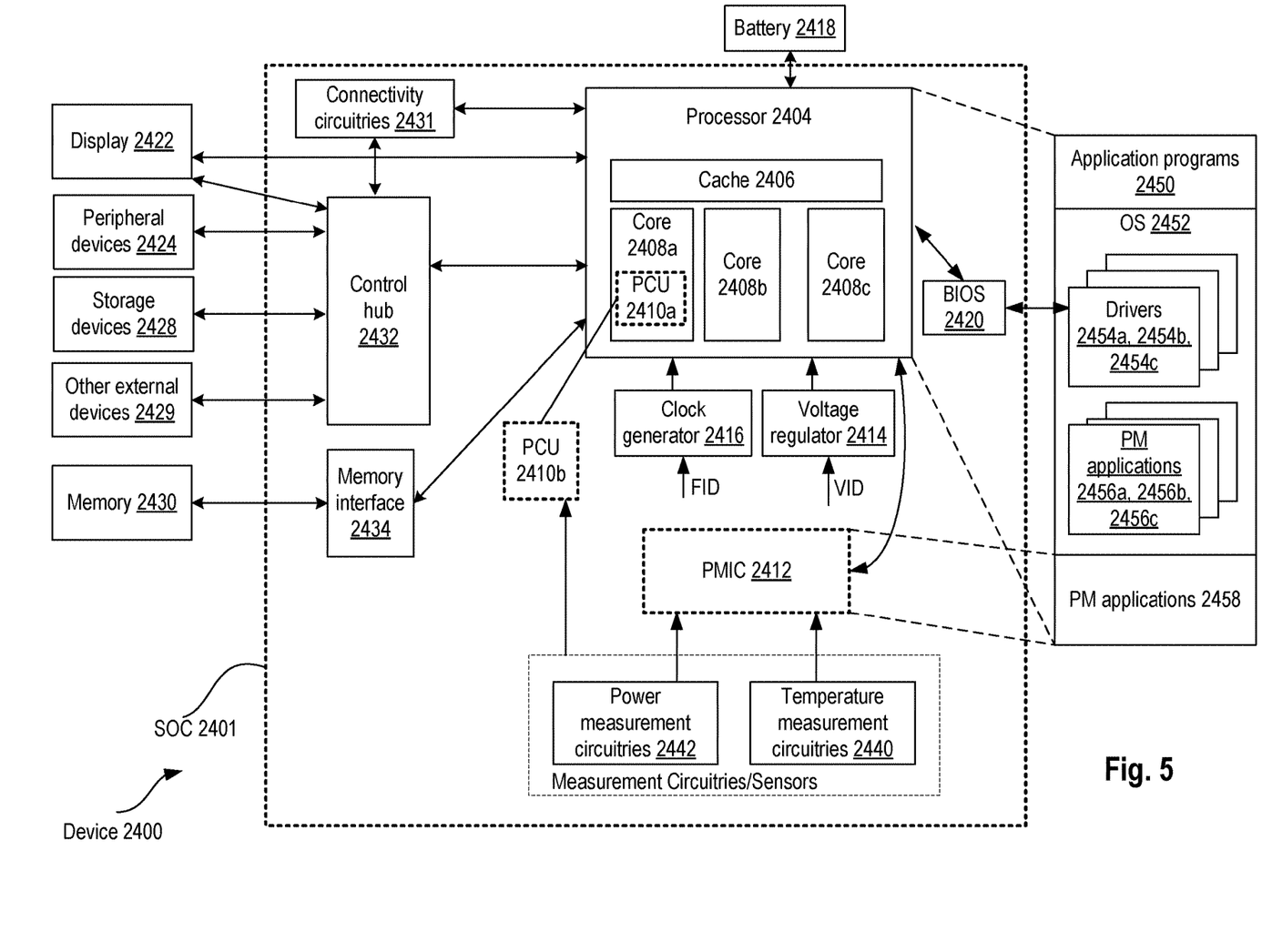
FIG. 5 illustrates a smart device or a computer system or a SoC (System-on-Chip) having apparatus and/or software to intelligently predict idle time to reduce entry energy cost, in accordance with various embodiments.

FIG. 5 illustrates a smart device or a computer system or a SoC (System-on-Chip) having apparatus and/or software to intelligently predict idle time to reduce entry energy cost associate with a deep sleep state, in accordance with various embodiments. It is pointed out that those elements of FIG. 5 having the same reference numbers (or names) as the elements of any other figure can operate or function in any manner similar to that described, but are not limited to such. While the various embodiments are illustrated as being performed by power management unit 101*a*, any of the blocks described here that can control power states for the computer system can have the apparatus and/or software to intelligently predict idle time to reduce entry energy cost associate with a deep sleep state. For example, PCU 2410*a*, PCU 2410*b*, and/or PMIC 2412 can perform the functions of power agent 101*a*.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises a SoC (System-on-Chip) 2401. An example boundary of the SOC 2401 is illustrated using dotted lines in FIG. 5, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408*a*, 2408*b*, 2408*c*. Although merely three cores 2408*a*, 2408*b*, 2408*c* are illustrated in FIG. 5, processor 2404 may include any other appropriate number of processing cores, e.g., tens, or even hundreds of processing cores. Processor cores 2408*a*, 2408*b*, 2408*c* may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408*a*, a second section of cache 2406 dedicated to core 2408*b*, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, a cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments, and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408a, 2408b, 2408c, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410a/b and/or PMIC 2412. In some embodiments, each core has a network of distributed LDOs to provide efficient control for power management. The LDOs can be digital, analog, or a combination of digital or analog LDOs.

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410a. In an example, some other sections of PCU 2410 may be implemented outside the processing cores 2408, and these sections of PCU 2410 are symbolically illustrated using a dotted box and labelled as PCU 2410b. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456a, 2456b, 2456c. The OS 2452 may also include various drivers 2454a, 2454b, 2454c, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Various embodiments described herein are illustrated as examples. The features of these examples can be combined with one another in any suitable way. These examples include:

Example 1: An apparatus comprising: a power management unit to compare a high water mark (HWM) with a current number of dirty cache lines; and a machine-learning logic to generate the HWM in accordance to telemetry information and/or the current number of dirty cache lines, wherein the power management unit is to cause the apparatus to enter a first power state if the current number of dirty cache lines is greater than the HWM, and wherein the power management unit is to cause the apparatus to enter a second power state if the current number of dirty cache lines is less than the HWM.

Example 2: The apparatus of example 1, wherein the machine-learning logic reads a time stamp counter to train a machine-learning model.

Example 3: The apparatus of example 1, wherein the machine-learning logic reads a time-in-state register to train a machine-learning model, wherein the time-in-state register indicates how long the apparatus is in a power state.

Example 4: The apparatus of example 1, wherein the machine-learning logic infers the HWM via trained weights and the telemetry information.

Example 5: The apparatus of example 1, wherein the first power state is less deep than the second power state.

Example 6: The apparatus of example 1, wherein the first power state is an S0i3 state, and wherein the second power state is an S0i4 state.

Example 7: The apparatus of example 1, wherein the machine-learning logic comprises multipliers.

Example 8: The apparatus of example 1, wherein the telemetry information includes one or more of: foreground applications at the time of a power state entry and/or exit; user calendar information indicative of free, busy, and/or out of office times; battery information; time of day; and/or day of week.

Example 9: The apparatus of example 1, wherein the machine-learning logic is controlled by or implemented by a software driver.

Example 10: The apparatus of example 9, wherein the software driver is communicatively coupled to an operating system.

Example 11: The apparatus of example 1, wherein the HWM is a threshold of number of dirty cache lines that allows the power management unit to decide whether to enter the first power state or the second power state.

Example 12: A machine-readable storage media having machine-readable instructions stored thereon, that when executed, cause one or more processors to perform a method comprising: reading telemetry information; and applying machine-learning to generate a high water mark (HWM) in accordance to the telemetry information and/or a current number of dirty cache lines, wherein the HWM is a threshold of number of dirty cache lines that allows a power management unit to decide whether to enter a first power state or a second power state.

Example 13: The machine-readable storage media of example 12, wherein the telemetry information includes one or more of: foreground applications at a time of a power state entry and/or exit; user calendar information indicative of free, busy, and/or out of office times; battery information; time of day; and/or day of week.

Example 14: The machine-readable storage media of example 12, wherein a computing system is to enter a first power state if the current number of dirty cache lines is greater than the HWM, or to enter a second power state if the current number of dirty cache lines is less than the HWM.

Example 15: The machine-readable storage media of example 12, wherein applying machine-learning comprises reading a time stamp counter to train a machine-learning model.

Example 16: The machine-readable storage media of example 12, wherein applying machine-learning comprises reading a time-in-state register to train a machine-learning model, wherein the time-in-state register indicates how long a computing system is in a power state.

Example 17: The machine-readable storage media of example 12, wherein applying the machine-learning comprises inferring the HWM via trained weights and the telemetry information.

Example 18: The machine-readable storage media of example 12, wherein the first power state is less deep than the second power state.

Example 19: The machine-readable storage media of example 12, wherein the first power state is an S0i3 state, and wherein the second power state is an S0i4 state.

Example 20: A system comprising: a memory; a processor coupled to the memory, wherein the processor comprises a power management unit to compare a high water mark (HWM) with a current number of dirty cache lines; a driver having machine-learning logic to generate the HWM in accordance to telemetry information and/or the current number of dirty cache lines, wherein the power management unit is to cause the processor to enter a first power state if the current number of dirty cache lines associated with the memory is greater than the HWM, and wherein the power management unit is to cause the processor to enter a second power state if the current number of dirty cache lines associated with the memory is less than the HWM; and a wireless interface to allow the processor to communicate with another device.

Example 21: The system of example 20, wherein the telemetry information includes one or more of: foreground applications at the time of a power state entry and/or exit;

user calendar information indicative of free, busy, and/or out of office times; battery information; time of day; and/or day of week.

Example 22: The system of example 20 comprising an operating system coupled to the driver.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
a power management unit to compare a high water mark (HWM) with a current number of dirty cache lines; and
a machine-learning logic to generate the HWM in accordance to telemetry information and/or the current number of dirty cache lines, wherein the power management unit is to cause the apparatus to enter a first power state if the current number of dirty cache lines is greater than the HWM, wherein the power management unit is to cause the apparatus to enter a second power state if the current number of dirty cache lines is less than the HWM, and wherein the machine-learning logic is to read a time stamp counter to train a machine-learning model.

2. The apparatus of claim 1, wherein the machine-learning logic is further to read a time-in-state register to train the machine-learning model, wherein the time-in-state register indicates how long the apparatus is in a power state.

3. The apparatus of claim 1, wherein the machine-learning logic infers the HWM via trained weights and the telemetry information.

4. The apparatus of claim 1, wherein the first power state is less deep than the second power state.

5. The apparatus of claim 1, wherein the first power state is an S0i3 state, and wherein the second power state is an S0i4 state.

6. The apparatus of claim 1, wherein the machine-learning logic comprises multipliers.

7. The apparatus of claim 1, wherein the telemetry information includes one or more of:
foreground applications at a time of a power state entry and/or exit;
user calendar information indicative of free, busy, and/or out of office times;
battery information;
time of day; and/or
day of week.

8. The apparatus of claim 1, wherein the machine-learning logic is controlled by or implemented by a software driver.

9. The apparatus of claim 8, wherein the software driver is communicatively coupled to an operating system.

10. The apparatus of claim 1, wherein the HWM is a threshold of number of dirty cache lines that allows the power management unit to decide whether to enter the first power state or the second power state.

11. A non-transitory machine-readable storage media having machine-readable instructions stored thereon, that when executed, cause one or more processors to perform a method comprising:
reading telemetry information; and
applying machine-learning to generate a high water mark (HWM) in accordance to the telemetry information and/or a current number of dirty cache lines and reading a time stamp counter to train a machine-learning model, wherein the HWM is a threshold of number of dirty cache lines that allows a power management unit to decide whether to enter a first power state or a second power state.

12. The non-transitory machine-readable storage media of claim 11, wherein the telemetry information includes one or more of:
foreground applications at a time of a power state entry and/or exit;
user calendar information indicative of free, busy, and/or out of office times;
battery information;
time of day; and/or
day of week.

13. The non-transitory machine-readable storage media of claim 11, wherein a computing system is to enter a first power state if the current number of dirty cache lines is greater than the HWM, or to enter a second power state if the current number of dirty cache lines is less than the HWM.

14. The non-transitory machine-readable storage media of claim 11, wherein applying machine-learning further comprises reading a time-in-state register to train the machine-learning model, wherein the time-in-state register indicates how long a computing system is in a power state.

15. The non-transitory machine-readable storage media of claim 11, wherein applying machine-learning comprises inferring the HWM via trained weights and the telemetry information.

16. The non-transitory machine-readable storage media of claim 11, wherein the first power state is less deep than the second power state.

17. The non-transitory machine-readable storage media of claim 11, wherein the first power state is an S0i3 state, and wherein the second power state is an S0i4 state.

18. A system comprising:
a memory;
a processor coupled to the memory, wherein the processor comprises a power management unit to compare a high water mark (HWM) with a current number of dirty cache lines;
a driver having machine-learning logic to generate the HWM in accordance to telemetry information and/or the current number of dirty cache lines, wherein the power management unit is to cause the processor to enter a first power state if the current number of dirty cache lines associated with the memory is greater than the HWM, wherein the power management unit is to cause the processor to enter a second power state if the current number of dirty cache lines associated with the memory is less than the HWM, and wherein the power management unit is configured to read a time stamp counter to train a machine-learning model; and
a wireless interface to allow the processor to communicate with another device.

19. The system of claim 18, wherein the telemetry information includes one or more of:
foreground applications at a time of a power state entry and/or exit;
user calendar information indicative of free, busy, and/or out of office times;
battery information;
time of day; and/or
day of week.

20. The system of claim 18 comprising an operating system coupled to the driver.

* * * * *